US007316320B2

(12) United States Patent
Sibbett et al.

(10) Patent No.: US 7,316,320 B2

(45) Date of Patent: Jan. 8, 2008

(54) SORTING CHARGED PARTICLES

(75) Inventors: Scott Sibbett, Corrales, NM (US); Gabriel P. Lopez, Albuquerque, NM (US)

(73) Assignees: Intel Corporation, Santa Clara, CA (US); STC.UNM, Albuquerque, NM (US)

(*) Notice: Subject to any disclaimer, the term of this patent is extended or adjusted under 35 U.S.C. 154(b) by 243 days.

(21) Appl. No.: 10/666,116

(22) Filed: Sep. 18, 2003

(65) Prior Publication Data

US 2005/0061714 A1 Mar. 24, 2005

(51) Int. Cl.
*B03C 9/00* (2006.01)
*B01D 59/38* (2006.01)

(52) U.S. Cl. ...................... 209/12.2; 209/129; 204/450

(58) Field of Classification Search ............... 209/12.2, 209/17, 127.1, 128–130; 204/450, 456, 600
See application file for complete search history.

(56) References Cited

U.S. PATENT DOCUMENTS

| | | | | |
|---|---|---|---|---|
| 5,632,957 | A * | 5/1997 | Heller et al. | 422/68.1 |
| 5,750,015 | A * | 5/1998 | Soane et al. | 204/454 |
| 5,858,195 | A * | 1/1999 | Ramsey | 204/601 |
| 5,914,025 | A * | 6/1999 | Small | 205/789 |
| 6,319,472 | B1 * | 11/2001 | Ackley et al. | 422/68.1 |
| 2002/0043462 | A1 | 4/2002 | Ivory et al. | |
| 2003/0127368 | A1 | 7/2003 | Sibbett | |
| 2004/0118688 | A1 * | 6/2004 | Dumas | 204/548 |
| 2004/0182709 | A1 * | 9/2004 | Griffiths et al. | 204/601 |
| 2004/0256230 | A1 * | 12/2004 | Yager et al. | 204/450 |
| 2005/0258040 | A1 * | 11/2005 | Ross et al. | 204/450 |

OTHER PUBLICATIONS

Robert D. Greenlee and Cornelius F. Ivory, Protein Focusing in a Conductivity Gradient, Biotechnol. Prog. 14, Jan. 1998, pp. 300-309.

Wendy S. Koegler and Cornelius F. Ivory, Field Gradient Focusing: A Novel Method for Protein Separation, Biotechnol. Prog. 12, 1996, pp. 822-836.

Zheng Huang and Cornelius F. Ivory, Digitally Controlled Electrophoretic Focusing, Analytical Chemistry, vol. 71, No. 8, Apr. 15, 1999, pp. 1628-1632.

Wendy S. Koegler and Cornelius F. Ivory, Focusing Proteins in an Electric Field Gradient, Journal of Chromatography A, vol. 726, 1996, pp. 229-236.

* cited by examiner

*Primary Examiner*—Joseph C. Rodriguez
(74) *Attorney, Agent, or Firm*—Trop, Pruner & Hu, P.C.

(57) ABSTRACT

Charged particles may undergo two different separations within a single device, without manual intervention to effect the transfer of the particles between separations. In some embodiments, the device may be a Micro-Electro-Mechanical System.

8 Claims, 6 Drawing Sheets

SORTING CHARGED PARTICLES

BACKGROUND

This invention relates generally to the analysis of charged particles and particularly to the analysis of proteins and peptides.

Techniques such as electrophoresis and chromatography may be used to separate charged molecules such as deoxyribonucleic acid (DNA), ribonucleic acid (RNA) and proteins. Generally, electrophoresis is used to separate charged molecules on the basis of their movement in an electric field. Chromatography on the other hand, is used to separate molecules based on their distribution between a stationary phase and a mobile phase.

Polyacrylamide gel electrophoresis (PAGE) is a standard tool in the study of proteins. Generally, with PAGE, proteins and peptides are exposed to a denaturing detergent such as sodium dodecylsulfate (SDS). SDS binds proteins and peptides. As a result, the proteins/peptides unfold and take on a net negative charge. The negative charge of a given SDS treated protein/peptide is roughly proportional to its mass. An electric field is then applied which causes the negatively charged molecules to migrate through a molecular sieve created by the acrylamide gel. Smaller proteins or peptides migrate through the sieve relatively quickly whereas the largest proteins or peptides are the last to migrate, if at all. Those molecules having a mass between the two extremes will migrate in the gel according to their molecular weight. In this way, proteins that differ in mass by as little as 2% may be distinguished.

Polyacrylamide gel electrophoresis may be used in conjunction with other electrophoretic techniques for additional separation and characterization of proteins. For example, native proteins may be separated electrophoretically on the basis of net intrinsic charge. That is, the intrinsic charge of a protein changes with the pH of the surrounding solution. Thus, for a given protein there is a pH at which it has no net charge. At that pH, the peptide will not migrate in an electric field. Thus, when proteins in a mixture are electrophoresed in a pH gradient, each protein will migrate in the electric field until it reaches the pH at which its net charge is zero. This method of protein separation is known as isoelectric focusing (IEF).

Isoelectric focusing and SDS-PAGE are commonly used in sequence to separate a protein or peptide mixture first in one dimension by IEF and then in a second dimension by PAGE. Isoelectric focusing followed by SDS-PAGE is commonly referred to as 2D-PAGE. Disadvantageously, 2D-PAGE requires the use of bulky equipment. Further, the chemicals required to run 2D-PAGE separations can be expensive and potentially hazardous. Additionally, running 2D-gels can be time consuming and usually requires a skilled technician to obtain satisfactory results. Even then, results may be variable and difficult to reproduce.

Other separation techniques, such as Matrix Assisted Laser Desorption/Ionization Time-Of-Flight Mass Spectrometry (MALDI-TOFMS) are available to separate polar compounds including proteins. However, MALDI-TOFMS requires a substantial investment in expensive equipment and labor.

Thus, there is a continuing need for improved devices and techniques to separate and characterize charged molecules including nucleic acids and peptides.

DETAILED DESCRIPTION

Figure 1:
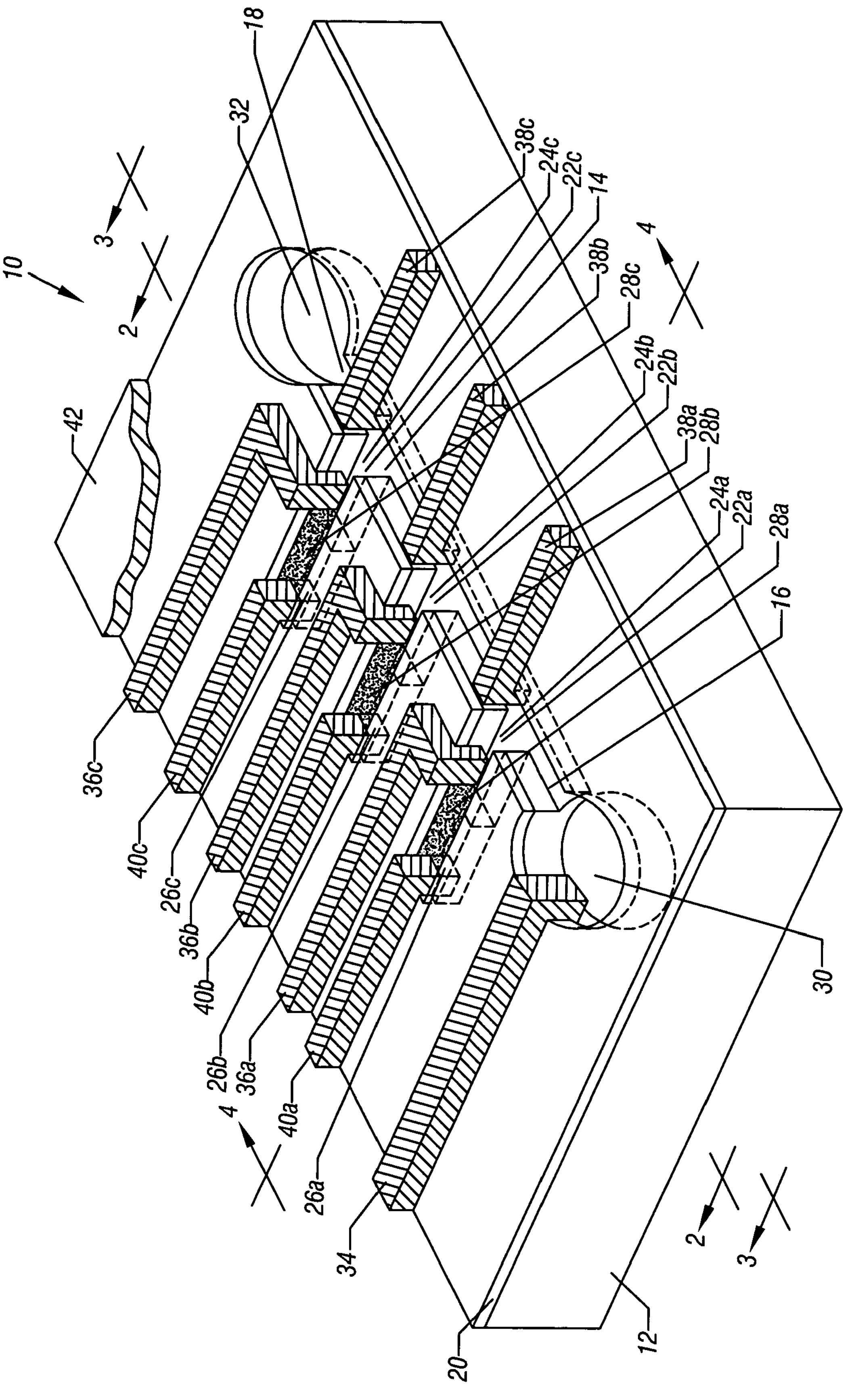
FIG. 1 is an enlarged perspective view of a device according to some embodiments of the present invention where one or more layers have been stripped away to show various features.

Referring to FIG. 1, a device 10 may be utilized to separate charged molecules such as proteins, peptides and nucleic acids in two different directions or dimensions. Generally, according to some embodiments of the present invention, charged molecules may be sorted and focused in a first direction by field gradient focusing. Thereafter, the molecules may be separated in a second direction by electrophoresis. Thus, according to some embodiments of the present invention, the two separation techniques may be combined such that there is little or no loss or scrambling of the charged molecules after the first separation.

The device 10 may be constructed according to known macro and micro scale fabrication techniques. For example, in embodiments where the device 10 is to be fabricated on the microscale, such as with Micro-Electro-Mechanical System (MEMS), complementary metal oxide silicon (CMOS) or other known semiconductor processing techniques may be utilized to form various features in and on a substrate 12. With MEMS, electronic and micromechanical components may reside on a common substrate. Thus, according to some embodiments of the present invention, the device 10 may have circuits and MEMS components formed thereon. Further, according to some embodiments of the present invention, MEMS components may include but are not limited to microfluidic channels, reservoirs, electrodes, detectors and/or pumps.

The substrate 12 may be any material, object or portion thereof capable of supporting the device 10. For example, in some embodiments of the present invention, the substrate 12 may be a semiconductor material such as silicon with or without additional layers of materials deposited thereon. Alternately, the substrate 12 may be any other material suitable for forming microfluidic channels therein such as glass, quartz, silica, polycarbonate or poly(dimethylsiloxane) (PDMS). In some embodiments, biocompatible materials such as parylene may be utilized to coat channels or other surfaces thereby minimizing absorption of charged molecules. If parylene is not utilized in a particular embodiment, the substrate 12 may be otherwise treated to minimize reaction between the substrate 12 and the particles to be sorted.

Figure 3:
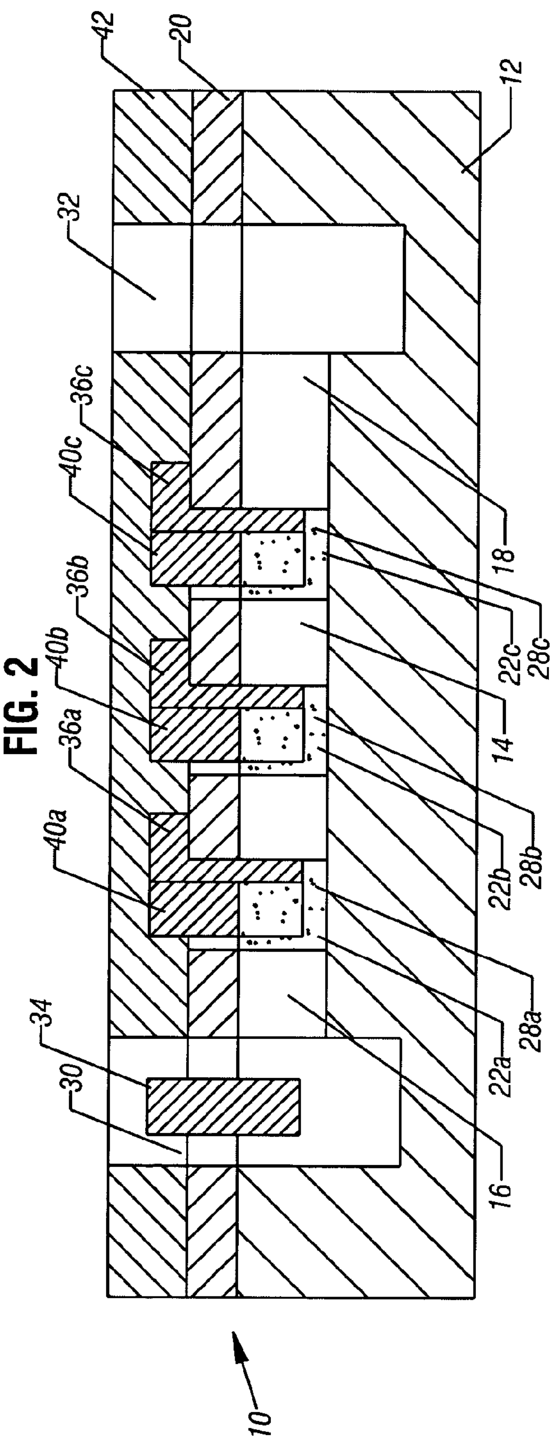
FIG. 3 is a second enlarged cross sectional view of the unmodified device of FIG. 1 taken generally along line 3-3.
Figure 4:
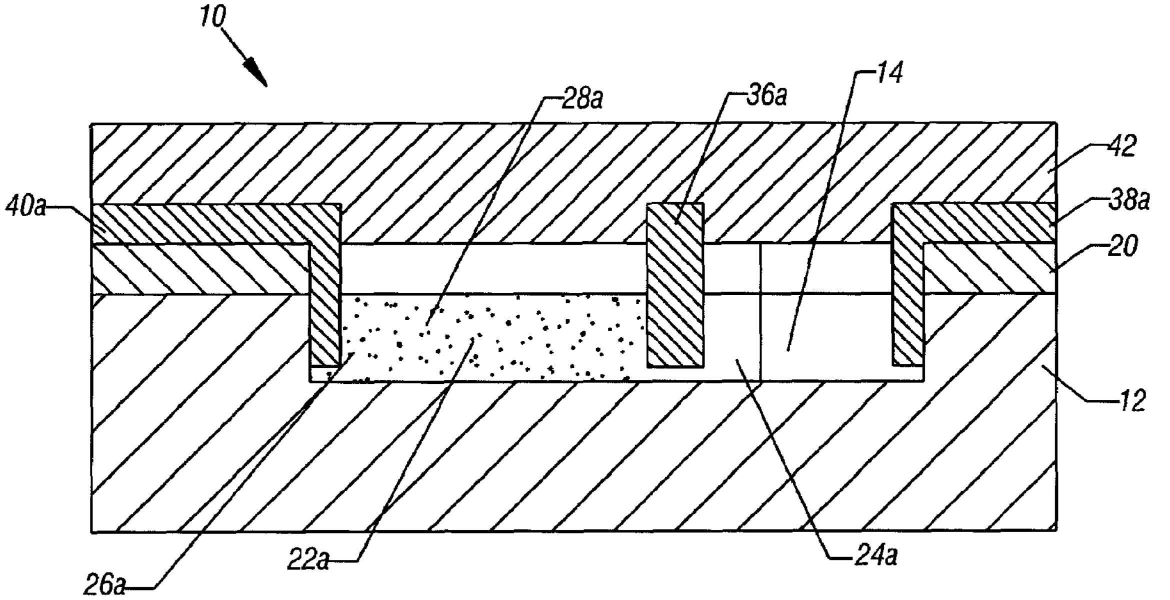
FIG. 4 is a third enlarged cross sectional view of the unmodified device of FIG. 1 taken generally along line 4-4.

Referring to FIGS. 1, 3 and 4, a first channel 14 may be formed in the substrate 12 for example by etching according to known techniques. The channel 14 may be of any desired length, width, depth and shape. According to some embodiments of the present invention, the channel 14 may be elongate having two ends 16 and 18 extending toward opposing ends of the substrate 12, although the invention is not so limited. Further, in embodiments where the channel 14 is a microfluidic channel, its width, depth and perhaps length may range from a few micrometers to a millimeter or more in dimension. As shown in FIGS. 1 and 3, the channel 14 is generally rectangular in shape. However, the channel 14 may be any suitable shape such as a "V" or "U" shape, although the invention is not so limited.

Referring to FIGS. 1-4, one or more sidearm or collecting channels 22 may also be formed in the substrate 12. As with channel 14, sidearm channels 22 may be etched according to known techniques. Alternately, in embodiments where the substrate 12 is PDMS known techniques such as soft lithography may be used to form channel 14 and sidearm channels 22 in the substrate 12.

Sidearm channels 22 may be coupled to and extend from the length of the channel 14 such that they have one end 24 that opens to channel 14 and a closed end 26 remote from channel 14. In this way, the channels 22 are in communication with channel 14. According to some embodiments of the present invention, the channels 22 are generally perpendicular to the channel 14 and parallel to each other, although the invention is not limited in this respect. Further, the sidearm channels 22 may be evenly spaced from each other along the length of channel 14. However, even spacing between sidearm channels 22 is not a requirement and the channels 22 may be so spaced to fit the needs of a particular application or fabrication parameters.

Figure 2:
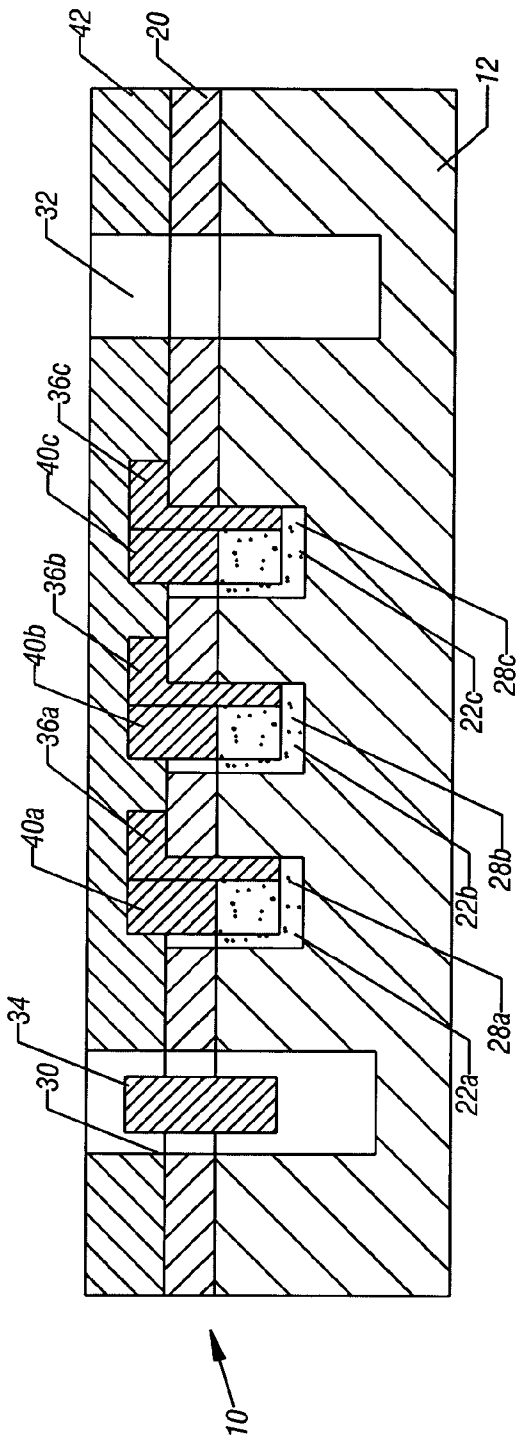
FIG. 2 is an enlarged cross sectional view of the unmodified device of FIG. 1 taken generally along line 2-2.

As shown in FIGS. 1 and 2, there are three sidearm channels 22. However, the number of channels 22 in any particular embodiment may depend upon the desired degree of particle focusing. For example, in an application where a higher degree of resolution is required, the device 10 will have more collecting channels 22 than in an application where less resolution is necessary. Thus, the invention is not limited as to the number of collecting channels 22. Moreover, the channels 22 may be engineered for optimal particle focusing. Accordingly, the collecting channels 22 may be any suitable length, width, depth, shape and distance from each other. As with channel 14, collecting channels 22 may be micrometers to millimeters in any dimension and rectangular, "V" or "U" shaped as examples.

According to some embodiments of the present invention, sidearm channels 22 may be at least partially filled with a sieving media 28. The sieving media may be disposed in channels 22 during device 10 fabrication. Alternately, sieving media 28 may be disposed in channels 22 at any time post device 10 fabrication. The sieving media 28 may be any media capable of forming a sieve including polyacrylamide, porous silicon, interferometrically-pattern substrates, sintered tantalum, block copolymers or photoresist, although the scope of the invention is not limited in this respect. The choice of sieving media 28 may depend upon the application for which the device 10 is to be used and/or fabrication parameters.

During subsequent processing, channels 14 and 22 may be covered by a second layer 20 to form closed channels 14 and 22. Alternately, in other embodiments, the layer 20 (and any additional layers) covers at least a portion of the length of channel 22. In this way openings (not shown) may be formed at one or both ends 24 and 26 of channels 22 such that the user of the device 10 may gain access to the channels 22.

Generally, any material that is suitable for the substrate 12 may form the second layer 20. However, substrate 12 and layer 20 are not required to be the same material in any given embodiment. For example, in some embodiments, the substrate 12 may be a semiconductor material whereas the layer 20 is a dielectric or vice versa. As such, the invention is not to be limited by the materials chosen to form the substrate 12 and layer 20, or the manner in which they are combined.

Referring to FIGS. 1-3, reservoirs 30 and 32 may be formed at least through layer 20 into substrate 12 to couple with ends 16 and 18 respectively of channel 14. In this way, the length of the channel 14 at each end 16 and 18 is extended by the diameter or length of the reservoirs 30 and 32. In embodiments that include additional layers, at least a portion of reservoirs 30 and 32 will be formed through the additional layers such that the reservoirs 30 and 32 will not be completely covered, thereby allowing the user of the device 10 to access the reservoirs. As shown in FIG. 1, reservoirs 30 and 32 are generally circular. However, the reservoirs 30 and 32 may be any shape and depth that is suitable for the particular application in which the device 10 is to be used and/or allowed by processing parameters.

Referring back to FIGS. 1-4, the device 10 may undergo additional processing to form various electrodes in association with reservoir 30, channel 14 and/or channels 22. The electrodes should not substantially obstruct the sort or separation of charged particles. A first electrode 34 may be disposed within reservoir 30. According to some embodiments, the electrode 34 may be a ground or reference electrode adapted to receive either negative or positive voltage when the device 10 is in use. For example, when negatively charged particles are to be classified, electrode 34 will be negatively charged. Alternately, where positively charged particles are to be separated according to some embodiments of the present invention, electrode 34 will be positively charged.

As shown in FIGS. 1-4, electrodes 36 are proximate to the channel ends 24 such that they extend into the channel 22. Thus, each electrode 36*a*, 36*b* and 36*c* is separated from electrode 34 by a different distance. Moreover, according to some embodiments of the present invention, electrodes 36*a*, 36*b* and 36*c* receive a voltage such that the potential difference between electrode 34 and electrodes 36*a*, 36*b* and 36*c* differs. As such, an electric field strength gradient with respect to reference electrode 34 may be applied to a solution to cause charged particles in the solution to migrate in channel 14.

In some embodiments, the applied electric field strength gradient may be positive (or negative depending upon the particles to be sorted) and linear, increasing from reservoir 30 toward reservoir 32. However, other electric field strength gradients may be produced as well. For example, the electric field gradient may be linear for a period of time and non-linear at a different point in time. Further, the device 10 may be physically adapted to generate non-linear gradients, for example by varying the number and/or distance between electrode 34 and electrodes 36 in a nonlinear fashion. Thus, device 10 may be adapted to produce a wide variety of electric field gradients for the separation of charged particles in an electric field.

Although electrodes 34 and 36 are shown in the figures as being disposed in reservoir 30 and the ends 24 of channels 22 respectively, the positioning (and number) of the electrodes 34 and 36 may be varied according to design preferences and/or experimental needs. For example, electrodes 36 may be disposed in channel 14, proximate the ends 24 of the channels 22. Alternately, electrodes 36 may be external to the channels 14 and 22, yet proximate thereto. Thus, the gradient electrodes 34 and 36 may be positioned on device 10 in any manner that is capable of applying a voltage or electric field gradient to a solution to cause charged particles in the solution to move through channel 14 in the direction of the electric field.

Further, according to some embodiments of the present invention, there is a one to one correspondence between the number of sidearm channels 22 and electrodes 36. The scope of the invention however, is not limited in this respect and there may be any number of gradient producing electrodes 36. In embodiments where at least some of the gradient producing electrodes 36 are proximate to or disposed in sidearm channels 22, particles having similar mobility characteristics will focus and collect therein.

Still referring to FIGS. 1-4, one electrode 40 in an electrode pair 38 and 40 may be disposed at or near the closed end 26 of sidearm channel 22. The other electrode 38 in the pair may be disposed in channel 14 opposite electrode 40. In other embodiments, electrodes 38 may be disposed at or near the open end 24 of sidearm channels 22, or they may be absent altogether. Further, in embodiments of the present invention where electrodes 36 are disposed at or near the open end 24 of collecting channels 22, the electrodes 36 may be utilized to form a pair with electrodes 40. Thus, embodiments of the present invention are not limited to the number and location of electrode pairs 40 and 38 or 36 so long as when an electric field is applied to a solution, charged particles in the solution are caused to migrate in the collecting channels 22.

The formation of electrodes 34, 36, 38 and 40 and their corresponding leads may be achieved by various fabrication techniques as is known in the art. For example, in some embodiments, contact holes (not shown) may be etched in the layer 20 and/or substrate 12. Thereafter, a conductive material such as gold, copper, aluminum, or titanium/platinum may fill the holes and be deposited on the substrate 12 or layer 20. If the substrate 12 and/or layer 20 is a conductive or semiconductive material, an insulating layer may be deposited prior to the metal layer. Patterning and etching may then be carried out to form the traces of electrodes 34, 36, 38 and 40. Reservoirs 30 and 32 and other openings such as at one or both ends 24 and 26 of the collecting channels 22 may be etched at the same time as the traces in some embodiments. This is but one example of how electrodes may be formed on device 10. The invention should not be construed as being limited by this or any other fabrication technique. Further, the process described herein is representative and should also not be considered as limiting. That is, the various features of device 10 may be formed in any way that will achieve the desired result both on the micro and macro scale.

As shown in the figures, the leads to the electrodes all extend in the same direction so that they are exposed on one side of the device 10. Other arrangements may be considered without affecting the scope of the invention. For example, leads may extend in various directions to be exposed on one or more sides of the device 10. Further, the electrodes shown in the figures all communicate to the top surface of layer 20. However, electrodes may, in some embodiments, be formed to communicate with the top or bottom surface of substrate 12. Thus, the manner in which the electrodes 34, 36, 38 and 40 are formed and receive voltage are not limiting and may be directed by design choice and/or process parameters.

In embodiments of the present invention where electrodes 34, 36, 38 and 40 leads are formed on layer 20, a layer 42 may be deposited on the device 10 according to known techniques to insulate the electrodes/leads. As such, in some embodiments reservoirs 30 and 32 and other openings may be subsequently formed according to known techniques such as by patterned etching.

The electrodes 34, 36, 38 and 40 may receive voltage from any suitable power supply. The power supply may be external or internal. Thus, the scope of the present invention is not to be limited by the manner in which voltage is supplied to the electrodes.

Figure 5:
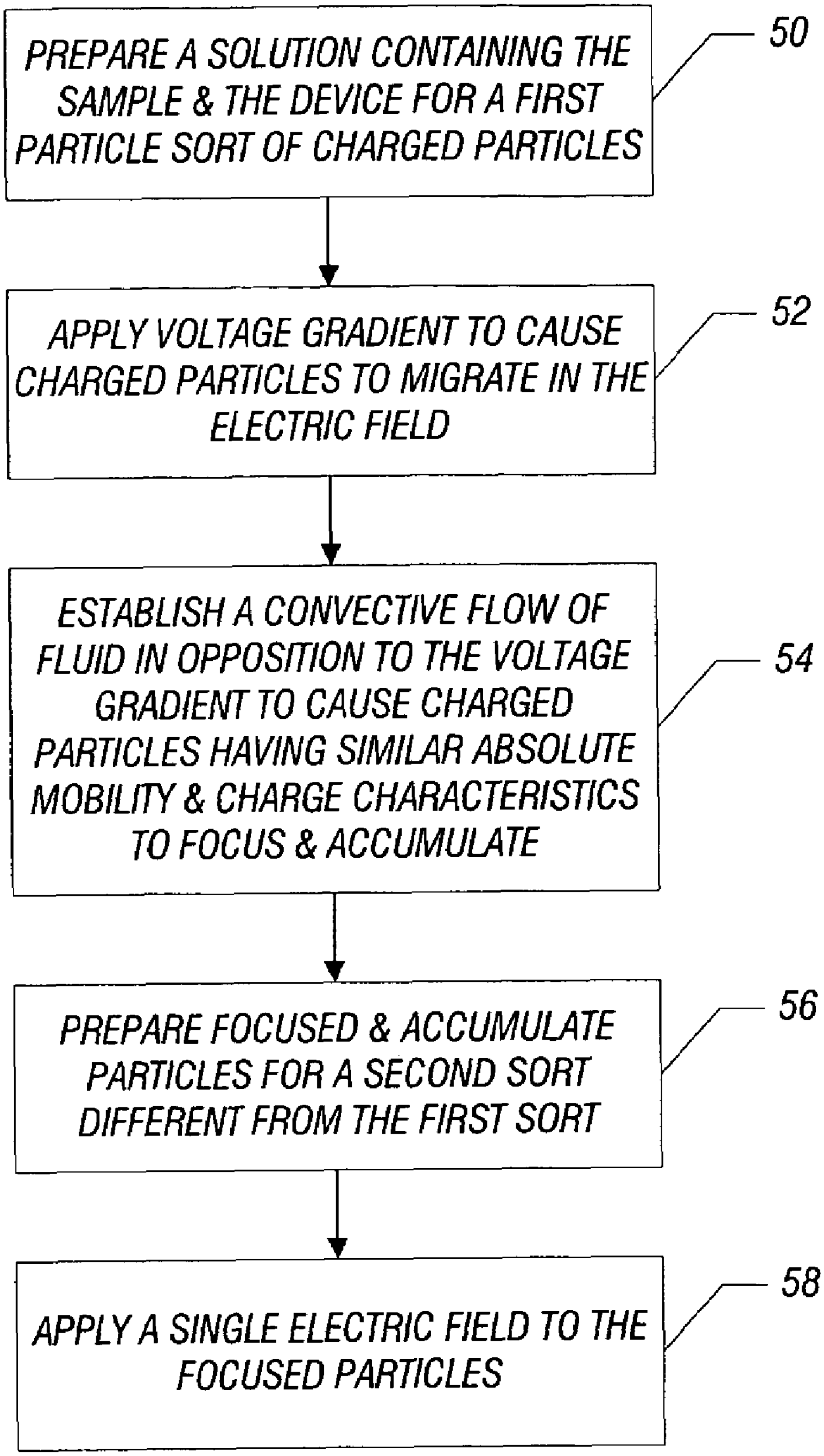
FIG. 5 is a block flow diagram for the separation of charged particles in two ways according to some embodiments of the present invention.

Referring to FIG. 5, prior to device 10 use, a sample may be prepared for loading into reservoir 30 as shown in block 50. Generally, the sample may be suspended in a liquid such as a buffer at a given pH. However, the invention is not so limited and the sample may be prepared in any manner that will achieve the desired particle separation. Where the device 10 is used in biological applications, the sample may be a pre-purified mixture of charged particles such as nucleic acids or proteins, although the invention is not so limited. As described herein for exemplary purposes only, the mixture of particles to be sorted using device 10 are peptides and proteins. However, the device 10 may be used to sort any charged particles, biological, pre-purified or not. Further, a mixture of uncharged molecules that are individually associated with a charged carrier may be separated using device 10. Thus, the type of particles to be separated and characterized using device 10 are not limited.

Channels 14 and 22 and the reservoirs 30 and 32 may be filled with a fluid, as indicated in block 50. The fluid may be the same fluid that the sample is dissolved in, although the invention is not so limited. Accordingly, any number of fluids may used to fill the channels 14 and 22 and the reservoirs 30 and 32.

Before, during or after sample loading in reservoir 30, an electric field gradient may be applied to the solution to cause charged proteins/peptides in the sample to migrate in channel 14 as outlined in block 52. For example, the voltage to electrodes 34 and 36*a*, 36*b* and 36*c* may be adjusted until the desired gradient is established. In this example, a positive field strength gradient is generated such that the potential difference between electrodes 34 and 36*a* is the least and the potential difference between electrodes 34 and 36*c* is the greatest; the potential difference between electrode 34 and 36*b* is there between to create a linearly increasing positive field strength gradient in channel 14. As a result, negatively charged proteins and peptides will leave well 30 and migrate through channel 14 toward reservoir 32. In contrast, positively charged and uncharged proteins/peptides will tend to remain in the reservoir 30. However, if positively charged particles are to be separated, the polarity of electrodes 34 and 36 may be reversed to generate a negative electric field gradient thereby causing positively charged particles to migrate in the electric field.

According to some embodiments of the present invention, the potential difference between the first electrode 34 and any one of the electrodes 36 may range from about 0.1 volts (V) to about 300 V. For example, in one embodiment, the potential at electrodes 36*a*, 36*b* and 36*c* may be 25 V, 50 V and 100 V respectively. However, embodiments of the invention are not limited to voltages between 0.1 V and 300 V. That is, some embodiments may utilize voltages outside of the stated range, which may depend upon the size of the device 10 and/or the channel 14.

Likewise, before, during or after sample loading in reservoir 30, a convective fluid flow may be established in channel 14 as indicated in block 54. For example, fluid may be moved from fluid source reservoir 32 toward reservoir 30 through the channel 14. Generally, when charged particles electrophoresed in a voltage gradient are opposed by a convective fluid flow they will sort based on their mobility. This technique of particle sorting or separating is typically known as field gradient focusing. Thus, through the use of field gradient focusing, and under a given set of conditions, molecules having similar mobility characteristics will stop migrating or focus at a unique position in channel 14 where the forces due to the electric field gradient and convective fluid flow balance or are cancelled out. As a result, one or more bands or groups of similarly focused particles will be distributed along the length of channel 14.

For example, proteins having similar charge that migrate about the same distance in channel 14 in opposition to the calculated convective fluid flow may focus at or near one of the electrodes 36*a*, 36*b* or 36*c*. The proteins that focus near each electrode 36*a*, 36*b* and 36*c* will collect in the respective sidearm channel 22. Thus, according to this example, there will be at least three groups of similarly focused proteins, one group collecting in each channel 22*a*, 22*b* and 22*c*. Increasing the number of collecting channels 22 and electrodes 36 along the length of channel 14 increases the number of focusing and accumulation points, hence the resolution of the system.

The force of convective fluid flow is calculated to enhance focusing of charged molecules at or near the sidearm channels 22. A conventional external pump may establish the convective flow of fluid. Alternately, in some embodiments, the convective flow of fluid may be established by a MEMS pump such as an electroosmotic pump or piezoelectric micropump. However, embodiments of the present invention should not be limited by the means for establishing convective fluid flow whether it is by pump, gravitational pull or other means.

Referring to FIG. 1, the gradient producing electrodes 36 are disposed in or proximate to the open ends 24 of channels 22. When in this configuration, similarly focused proteins/peptides may be actively induced to collect in the open end 24 of the collecting channel 22 that is proximate to the focusing point of the charged particle. Alternately, in embodiments where the electrodes 36 are disposed in channel 14 near the open ends 24 of the channels 22, similarly focused proteins may diffuse into the adjacent collecting channel 22 to accumulate. Nonetheless, once accumulated in a collecting channel 22, similarly focused molecules may be prevented from diffusing through the length of the channel 22 by the sieving media 28 disposed within the channel 22. Further, molecules accumulated in a sidearm channel 22 may try to return to the first channel 14. However, the same forces that originally caused the molecule to enter the channel 22 cause it to reenter or remain in the same sidearm channel 22. Because the channels 22 are physically separated the charged molecules do not move laterally between the channels 22.

Molecules may be focused and then collected in sidearm channels 22 by either batch or continuous mode according to some embodiments of the present invention. During batch mode, the entire sample is loaded in reservoir 30 for separation and collection in the sidearm channels 22. In contrast, in continuous mode, one or more samples may be continuously loaded into reservoir 30 for separation and collection in the channels 22 over a period of time. Nevertheless, in both modes the longer the first separation is allowed to run, the greater the recovery of molecules. In other words, more molecules will tend to accumulate in the sidearm channels 22 over a longer period of time.

After a desired length of time, field gradient focusing may be terminated such that the focused particles that have accumulated at or near the open end 24 of sidearm channels 22 may undergo further separation in the channels 22. For example, referring to FIG. 5, proteins may be denatured by a detergent such as SDS and/or a reducing agent as indicated in block 56. SDS may be infused into the sidearm or collecting channels 22, for example by hydrodynamic pressure or gel electrophoresis, although the scope of the invention is not limited in this respect. SDS binds proteins and peptides to give the molecules a net negative charge, which is roughly proportional to mass.

Conventional electrophoresis by SDS-PAGE utilizes a polyacrylamine gel as a molecular sieve. Similarly, according to some embodiments of the present invention, one or more sidearm channels 22 may be filled, partly or entirely, with a sieving media 28 during device 10 fabrication. In this way, charged particles may be caused to migrate through the molecular sieve thereby sorting the particles in a second direction or dimension as indicated in block 58. For example, when a potential is applied across electrodes 38 and 40, the negatively charged proteins/peptides will be drawn toward the positive electrode. However, the sieve impedes the progress of the charged particles. Generally, proteins and peptides having the least molecular weight migrate the fastest through the sieve toward closed ends 26 of the channels 22. Thereafter, proteins/peptides migrate in the channels 22 towards the closed end 26 according to their molecular weight, with the sieve impeding the larger proteins to a greater extent than smaller proteins/peptides. Thus, the proteins and peptides first sorted in the electric field gradient may be further separated in channels 22.

After a given amount of time, the electric field between electrodes 38 and 40 may be removed to stop the second separation. The separated particles may be detected by any known means. For example, aliquots of eluant may be removed from channels 22 at timed intervals for further analysis. Alternately, in some embodiments the charged particles may be stained, or if radioactive, a film may be exposed. Largely, the user of the device 10 decides what technique should be used for particle detection. Thus, the scope of the present invention should not be limited in this respect.

Figure 6:
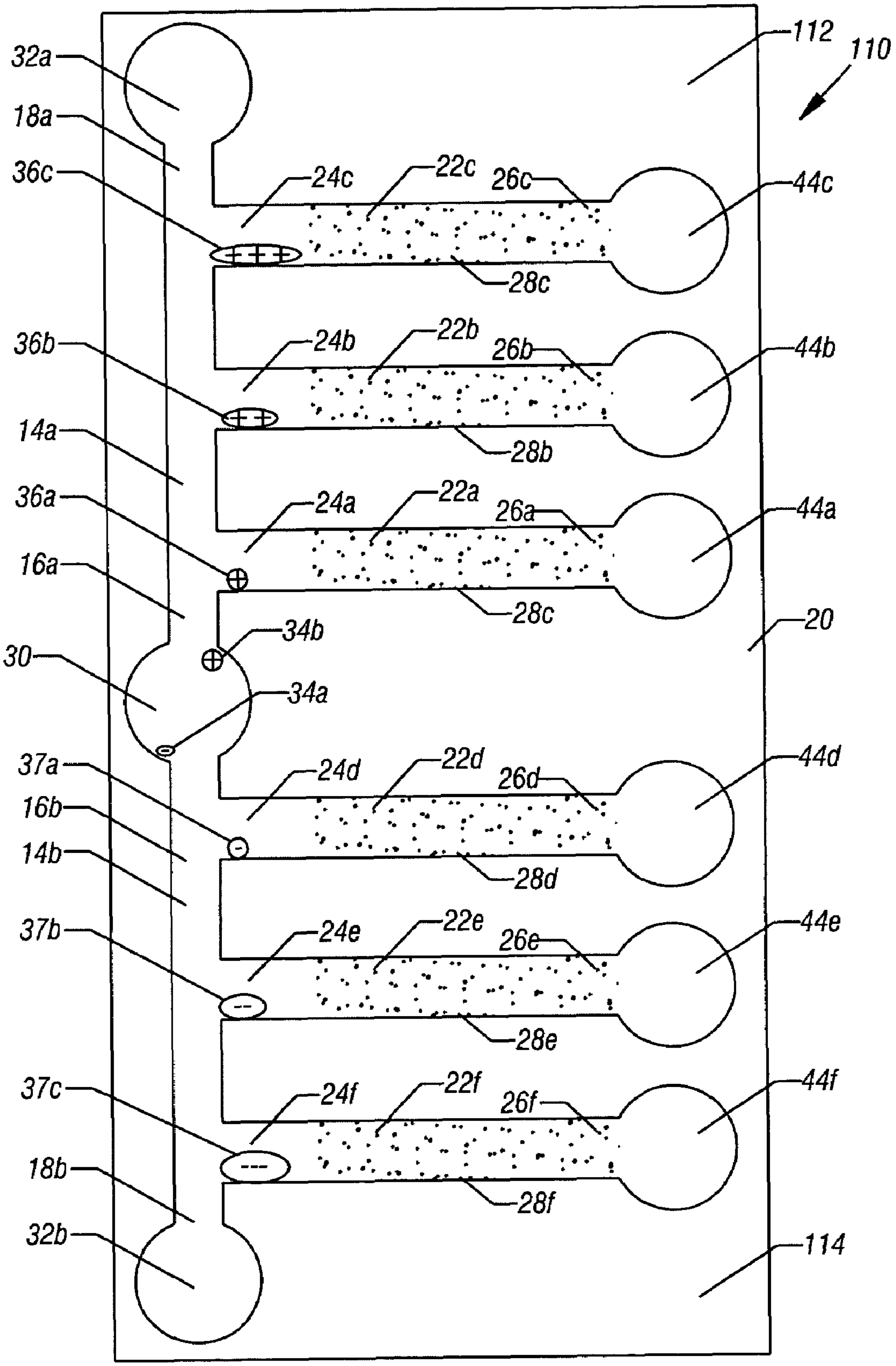
FIG. 6 is a top plan view of an alternate embodiment of the device of the present invention where one or more layers have been stripped away to show various features including electrodes, which are depicted by absolute charge.
Figure 7:
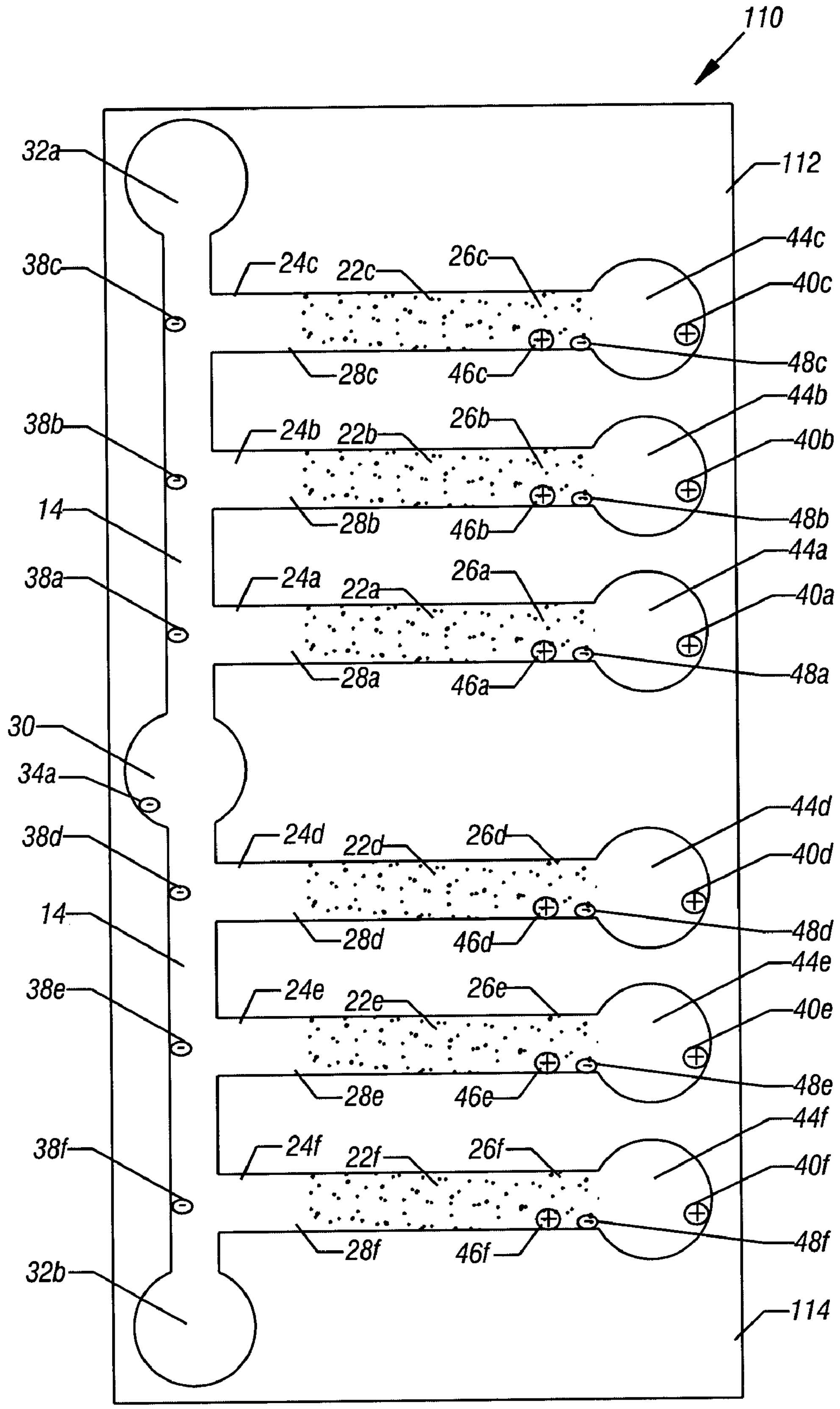
FIG. 7 is a top plan view of the same device as FIG. 6 where other electrodes are depicted by absolute charge.

Referring to FIG. 6, a device 110 may be utilized to simultaneously sort positively and negatively charged particles by field gradient focusing in a first dimension. Referring to FIG. 7, the same device 110 may thereafter be utilized to electrophoretically sort the charged particles that have focused and accumulated in the sidearm channels 22 in a second dimension, in substantially the same way as described above with respect to device 10. In fact, the device 110 is similar to device 10 in many respects. For example, the device 110 has two halves, 112 and 114, which in some embodiments are generally mirror images. The two halves 112 and 114 are generally mirror images in that both halves include the same sample-receiving reservoir 30 for descriptive purposes. Otherwise, the two halves 112 and 114 may be mirror images in that each half includes substantially the same structures configured in substantially the same way, allowing for some variations. Nonetheless, the two halves 112 and 114 of device 110 are not required to be substantially alike and may take on a variety of configurations, all within the scope of the present invention.

The first half 112, may be configured such that it is nearly identical to any embodiment described with respect to device 10. As shown in FIGS. 6 and 7, a distinction between the first half 112 of device 110 and device 10 is the presence of reservoirs 44 disposed at the distal ends 26 of the collecting channels 22. In this way, the reservoirs 44 are in communication with the channels 22. Because the length of the reservoirs 44 increases the length of channels 22, the positive electrode 40 of the electrode pair 38 and 40 is disposed in reservoir 44 proximate the closest edge of the layer 20, although the invention is not so limited. As shown in FIGS. 6 and 7, the electrodes 34, 36, 38, 40, 46 and 48 are schematically represented by either a (+) or (−) charge.

The first half 112 of device 110 may include a second electrode pair 46 and 48. The electrode pair 46 and 48 carries a low voltage for the detection of charged particles as they emerge from the sieving media during the second electrophoretic separation. For example, as a molecule of a given molecular weight emerges from the sieving media and moves toward electrode 40, it may be detected by a slight change in conductivity as it passes through the electric field generated by electrodes 46 and 48. Thereafter, the molecule may be further analyzed as desired by the user of the device 110.

As shown in FIG. 7, the electrode pairs 46 and 48 are disposed on the same side of channel 22, proximate to the distal end 26. In other embodiments, the electrode pairs 46 and 48 may be disposed on the other side of the channels 22 or in the reservoirs 44. Further, as with electrodes, 34, 36 and 40, the electrode pairs 46 and 48 may be connected to an edge of the device 110 via leads that communicate with the upper surface of layer 20. Alternately, in some embodiments, the electrode pair 46 and 48 may communicate with the under surface of device 110. Thus, the exact configuration and location of the electrode pair 46 and 48 is not limited. They may be placed anywhere that will allow an electric potential to be generated for the detection of particles as they migrate toward reservoirs 44 and that does not substantially block particle migration. Although the reservoirs 44 and detection electrodes 46 and 48 are not shown with respect to device 10, it should be readily appreciated that device 10 could be easily adapted to include these features.

Referring to FIGS. 6 and 7, the second half 114 of device 110 may generally be the mirror image of the first half 112. In other embodiments, the two halves 112 and 114 are not mirror images yet retain the same structural components. For example, the channels 22 of the first half 112 may extend toward one side of the device 110 whereas the channels 22 of the second half 114 may extend toward the opposing side of device 110. Further, channels 22*a*, 22*b* and 22*c* may be spaced apart from reservoir 30 in a manner that is different from the channels 22*d*, 22*e* and 22*f*. Additionally, the spacing between channels 22*a*, 22*b* and 22*c* may differ from the spacing between channels 22*d*, 22*e* and 22*f*. Thus, the two halves 112 and 114 may be include the same types of structural attributes yet be configured in a number of ways to achieve the desired sorting.

Halves 112 and 114 may differ in the polarity of the electric field or voltage gradient generated for the implementation of field gradient focusing. Generally, the device 110 may have one or more ground electrodes 34 disposed in reservoir 30 in a manner that will not obstruct particle separation. A first voltage gradient between electrode 34*a* (or 34*b*) and electrodes 36*a*, 36*b* and 36*c* may cause a first particle type (in solution) having a first absolute charge to migrate in channel 14*a* in opposition to convective fluid flow. As such, particles of the first type will focus at various points along the length of channel 14*a* and accumulate in collecting channels 22*a*, 22*b* and 22*c* as described with respect to device 10.

In some embodiments of the present invention, a second field strength gradient may be generated in channel 14*b*. Note though that the two gradients are in the same direction or dimension with respect to the second electric field applied between electrodes 38 and 40. The two voltage gradients may be generated at generally the same time or sequentially although embodiments are not so limited. The second gradient may be between electrode 34*b* (or 34*a*) and electrodes 37*a*, 37*b* and 37*c*. This gradient is adapted to cause a second particle type having a second absolute charge to migrate in the second gradient in opposition to convective fluid flow. As such, particles of the second type will focus at various points along the length of channel 14*b* and accumulate in collecting channels 22*d*, 22*e* and 22*f* according to their mobility characteristics.

For example, a negative voltage gradient may be generated with respect to the ground 34*b* and electrodes 37*a*, 37*b* and 37*c*. As shown schematically in FIG. 6, there is a relative increase in the negative potential and distance between the electrodes 37*a*, 37*b* and 37*c* with respect to ground 34. Thus, when in use, positively charged proteins will migrate in the negative gradient generated in channel 14*b*. A convective flow of fluid opposes the negative electric field gradient in the same manner as described with respect to device 10. Thus, bands of proteins having similar positive mobility characteristics will focus at or about electrodes 37*a*, 37*b* and 37*c*. Proteins that are similarly focused collect in an adjacent sidearm channel 22 as previously described. Accordingly, device 110 has been adapted to sort both positively and negatively charged proteins or other particles in a first dimension or direction at the same time using field gradient focusing.

The convective fluid flow in device 110 may be similar to that of device 10. For example, fluid circulates from fluid source reservoirs 32*a* and 32*b* to the central reservoir 30. Further, one or more pumps, as is known in the art, may establish and maintain the fluid flow. A pump may be a MEMS pump fabricated on the substrate 12. Alternately, the pump may be an external pump, which may also be a MEMS pump in some embodiments.

In contrast to device 10, the force or rate of fluid flow in each branch 14*a* and 14*b* of the channel 14 does not have to be the same. The flow rate in branch 14*a* may be greater or less than the flow rate of fluid in branch 14*b*. In this way, each half 112 and 114 of the device 110 may be adapted to separate or sort the differently charged particles in a manner that is best suited to enhance focusing along the length of the channel 14*a* or 14*b* and proximate to the sidearm channels 22. Flow rate in the two branches 14*a* and 14*b* may be established by utilizing two different pumps and/or providing branches 14*a* 14*b* with different cross sectional areas as examples.

Referring to FIG. 7, after the negatively charged and positively charged particles have been sorted and focused in channel branch 14*a* and 14*b* respectively, the particles may undergo a second separation in the sidearm channels 22 in the same manner as described with respect to device 10. Further, as with device 10, the channels 22 of device 110 are filled with sieving media 28. Thus, the focused and accumulated particles will remain at or near the openings 24 until subsequent separation.

Prior to subsequent separation, positively and negatively charged proteins/peptides may be treated with SDS and/or a reducing agent as described with respect to device 10. Consequently, all proteins will carry a net negative charge that is roughly proportional to their mass. Thereafter, the groups of proteins in each channel 22 are electrophoresed through the molecular sieve 28 as described with respect to device 10. Thus, as shown in FIGS. 6 and 7, up to six groups or bands of proteins may undergo a second sort via electrophoresis; each group electrophoretically separated according to molecular weight in one of the channels 22*a*, 22*b*, 22*c*, 22*d*, 22*e* or 22*f*.

During or after electrophoretic separation, protein bands may be detected by any desired means. With respect to the device 110, bands of proteins may be detected in each channel 22 as they pass through the conductivity detector (electrodes 46 and 48) disposed in the distal end 26 of the channels 22. Thereafter, protein bands may be collected for further study. As such, in some embodiments, reservoirs 44 may be accessible to the device 110 user.

The device 110 may be fabricated in generally the same way as device 10, accounting for additional features such as channels, electrodes and a third reservoir. Generally, channel 14, sidearm channels 22 and reservoirs 30, 32 and 44 are formed in substrate 12. A second layer 20 may cover channel 14 and channels 22. In contrast, reservoirs 30, 32 and 34 may be formed through layer 20 and any other additional layers. Electrodes 34, 36, 37, 38 and 40 (and optionally 46 and 48), and associated leads may be formed during additional processing of device 110. The electrodes may be disposed in any manner that will achieve the desired electric field so long as particle separation is not obstructed. Further, if disposed within the reservoir 30 or 44, channel 14 or sidearm channel 22, the depth to which the electrode extends may be one of choice and/or of processing parameters. In embodiments where the electrodes/leads are formed on the surface of layer 20, a top layer 42 (not shown) may cover the leads.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

applying an electric field to a solution containing charged particles under conditions that will cause negatively and positively charged particles to focus along the length of a first channel formed in a device, the negatively charged particles to focus in the first channel in one direction, the positively charged particles to focus in the first channel in the opposite direction; and applying another electric field to cause at least some of the focused, negatively charged particles to migrate through a sieve disposed in one second channel in said device and at least some of the focused, positively charged particles to migrate through the sieve disposed in another second channel in said device, said one second channel and said another second channel situated proximate an area where at least some of said negatively and positively charged particles have focused respectively, both of said second channels transverse to said first channel and in communication therewith.

2. The method of claim 1 including causing the negatively charged particles to separate and focus along the length of the first channel such that groups of negatively charged particles are focused at or near each one second channel in a plurality of said one second channels.

3. The method of claim 2 including establishing a convective force in said solution, said convective force to oppose the first and the second electric field gradients.

4. The method of claim 1 further including causing said focused positively charged particles to become negatively charged.

5. The method of claim 1 wherein applying first and second electric fields includes applying two linear electric fields.

6. The method of claim 4 further including detecting charged particles in both of said second channels.

7. The method of claim 6 wherein detecting charged particles in both of said second channels includes detecting a change in conductivity in a region of said second channels.

8. The method of claim 1 wherein applying the electric field includes applying first and second electric field gradients to a solution containing proteins or portions thereof.

* * * * *